(12) United States Patent
Lau

(10) Patent No.: US 9,861,173 B2
(45) Date of Patent: Jan. 9, 2018

(54) SUITCASE WITH CHARGING FUNCTION

(71) Applicant: Sze Wai Stevenson Lau, Hong Kong (HK)

(72) Inventor: Sze Wai Stevenson Lau, Hong Kong (HK)

( * ) Notice: Subject to any disclaimer, the term of this patent is extended or adjusted under 35 U.S.C. 154(b) by 127 days.

(21) Appl. No.: 14/977,673

(22) Filed: Dec. 22, 2015

(65) Prior Publication Data

US 2016/0192755 A1 Jul. 7, 2016

(30) Foreign Application Priority Data

Jan. 5, 2015 (HK) .................................. 15100053

(51) Int. Cl.

| H02J 7/00 | (2006.01) |
|---|---|
| A45C 15/00 | (2006.01) |
| A45C 5/14 | (2006.01) |
| H02K 7/18 | (2006.01) |
| H02J 7/14 | (2006.01) |
| H02K 7/116 | (2006.01) |

(52) U.S. Cl.
CPC ............... *A45C 15/00* (2013.01); *A45C 5/14* (2013.01); *H02J 7/1415* (2013.01); *H02K 7/1846* (2013.01); *H02K 7/116* (2013.01)

(58) Field of Classification Search
CPC ....... Y02E 60/12; H02J 7/0042; H02J 7/0045; H02J 7/1415; H01M 10/44; H01M 10/46; A45C 15/00; A45C 5/14; H02K 7/1846; H02K 7/116
USPC ........................................................ 320/107
See application file for complete search history.

(56) References Cited

U.S. PATENT DOCUMENTS

| 2006/0032687 A1* | 2/2006 | Park ..................... A45C 5/14 180/65.1 |
| 2007/0090702 A1* | 4/2007 | Schiller ................ A45C 5/14 310/75 C |

(Continued)

FOREIGN PATENT DOCUMENTS

| CN | 1603677 A | 4/2005 |
| CN | 201995814 U | 10/2011 |
| CN | 202167889 U | 3/2012 |

OTHER PUBLICATIONS

International Search Report of PCT Patent Application No. PCT/IB2015/059814 dated Jul. 26, 2016.

*Primary Examiner* — Yalkew Fantu
*Assistant Examiner* — Mohammed J Sharief

(57) ABSTRACT

A suitcase with charging function, comprising: a suitcase body; rollers disposed at the bottom of the suitcase body; current generating devices disposed on rollers; a PCB, connected to the current generating device; a rechargeable battery, connected to PCB. Wherein the current generating device comprises: a roller bracket, fixed to the bottom of the suitcase body and connected to the roller through a roller shaft; a power generator fixing plate, fixed on the roller bracket and having a generator PCB and power lines; a power generator, fixed on the power generator fixing plate and connected to the generator PCB. There is a first gear on the roller connected to the roller shaft, and a second gear on the shaft of the power generator, and the second gear is engaged with the first gear directly or through transmission gears. The rechargeable battery has a built-in circuit board and at least one output port.

20 Claims, 18 Drawing Sheets

(56) References Cited

U.S. PATENT DOCUMENTS

| | | | | |
|---|---|---|---|---|
| 2010/0320967 A1* | 12/2010 | Sa | ............... | H01M 2/1022 |
| | | | | 320/112 |
| 2013/0221898 A1* | 8/2013 | Frost | ............... | H02K 7/1846 |
| | | | | 320/107 |
| 2014/0087236 A1* | 3/2014 | Murayama | ......... | H01M 2/1022 |
| | | | | 429/156 |

* cited by examiner

SUITCASE WITH CHARGING FUNCTION

CROSS-REFERENCE TO RELATED APPLICATIONS

The present application claims the benefit of Hong Kong Patent Application No. 15100053.7 filed on Jan. 5, 2015, the contents of which are hereby incorporated by reference.

TECHNICAL FIELD

The present invention relates to a suitcase, particularly to a suitcase with charging function.

DESCRIPTION OF THE BACKGROUND

Nowadays, handheld electronic devices, such as: smart phones, mobile phones, flat computers and notebooks, are all necessities of life, so how to quickly and easily charge the rechargeable batteries of the foregoing handheld electronic devices becomes a key factor improving people's living standard.

Most people charge handheld electronic devices with a charger at home or in the office. However, travelers probably are unable to charge their mobile phones and other electronic devices on the road. Of course, some people might carry portable power sources (batteries) in case of need, but portable power sources also need to be charged with a charger. Therefore, so far, no effective means is available to solve the problem of charging on the road.

Some people have developed suitcases, which can generate power, but these suitcases have never been put into the market because their design has the following problems:

1. The internal mechanism of the suitcase has large friction force (internal resistance), making the suitcase difficult to move.
2. The generated current is too low to effectively charge handheld electronic devices.
3. The suitcase is often moved around or kept in a humid and dusty place. It does not have effective damp-proof and dust-proof design, thus resulting in failure of the charging device.
4. The rechargeable battery is not protected. Battery damage is extremely dangerous, even may trigger explosion. Besides, battery design must also conform to the provisions of international airline companies.

SUMMARY OF THE INVENTION

The features and advantages of the present invention will be partially stated in the description below, or become evident from such description, or be learnt through practicing the present invention.

In order to overcome the problems of the prior art, the present invention provides a suitcase with charging function, comprising: a suitcase body; at least two rollers disposed at the bottom of the suitcase body; a current generating device disposed on one of the rollers; a PCB connected to the current generating device and used to convert alternating current into direct current and regulating and stabilizing voltage; a rechargeable battery connected to the PCB through wires. The current generating device comprises: a roller bracket fixed to the bottom of the suitcase body and connected to the roller through a roller shaft; a power generator fixing plate fixed on the roller bracket and having a generator PCB and power lines; at least one power generator fixed on the power generator fixing plate and connected to the generator PCB. The roller connected to the roller shaft has a first gear, and the shaft of the power generator has a second gear. The second gear is engaged with the first gear directly or through transmission gears. The power generator can always effectively generate current no matter it rotates clockwise or anticlockwise. The current generating device can work normally even though every roller moves at different speed and in different directions. The rechargeable battery comprises a built-in circuit board for stabilizing voltage and limiting current, and comprises at least one output port for charging various types of electronic products.

According to one embodiment of the present invention, the suitcase has two rollers and every roller is provided with a current generating device. In the current generating device, there are two power generators. The power generator and the second gear are on the front and back sides of the power generator fixing plate respectively. The second gear is engaged with the first gear through a transmission gear.

The transmission gears include: a first transmission gear engaged with the first gear on the roller; a second transmission gear connected to the first transmission gear and simultaneously engaged with the second gears on the shafts of two power generators.

According to another embodiment of the present invention, the suitcase has four rollers and every roller is provided with a current generating device. In this embodiment, the roller bracket of the current generating device comprises a first clamping plate and a second clamping plate which are relatively disposed, as well as a fixing plate connecting the first clamping plate and the second clamping plate. The roller is between the first clamping plate and the second clamping plate, and the fixing plate is above the roller. The roller shaft passes through the first clamping plate, the first gear on the roller, the roller and the second clamping plate in turn. The power generator fixing plate is fixed outside the first clamping plate.

There is also a central shaft lever, which passes through the fixing plate and the bottom of the suitcase body and is used to fix the roller bracket to the bottom of the suitcase body. In addition, the first gear is located in a groove on the inner side of the first clamping plate and is engaged with the second gear directly.

There is also a wire anti-intertwining module on the roller bracket. From bottom to top, the central shaft lever passes through the fixing plate, wire anti-intertwining module, seal cover and top cover in turn, and the central shaft lever is fixed to the bottom of the suitcase body by the top cover. There is also an inner cap disposed on the top cover.

According to another embodiment of the present invention, the suitcase has four groups of rollers and every group of rollers is provided with a current generating device. Every group includes two rollers connected through a connecting shaft.

According to the foregoing embodiments of the present invention, even though every roller moves at different speed and in different direction, the current generating device of the suitcase can work normally.

Through reading the description, those ordinary skilled in the art will know better the features and contents of these technical schemes.

BRIEF DESCRIPTION OF THE DRAWINGS

The present invention will now be described by referring to the accompanying drawings that illustrate the embodiments of the invention, from which its advantages and realization methods will be evident. The contents shown in the accompanying drawings are intended to illustrate and not to limit this invention in any sense. Among the accompanying drawings.

DETAILED DESCRIPTION OF PREFERRED EMBODIMENTS

Figure 1:
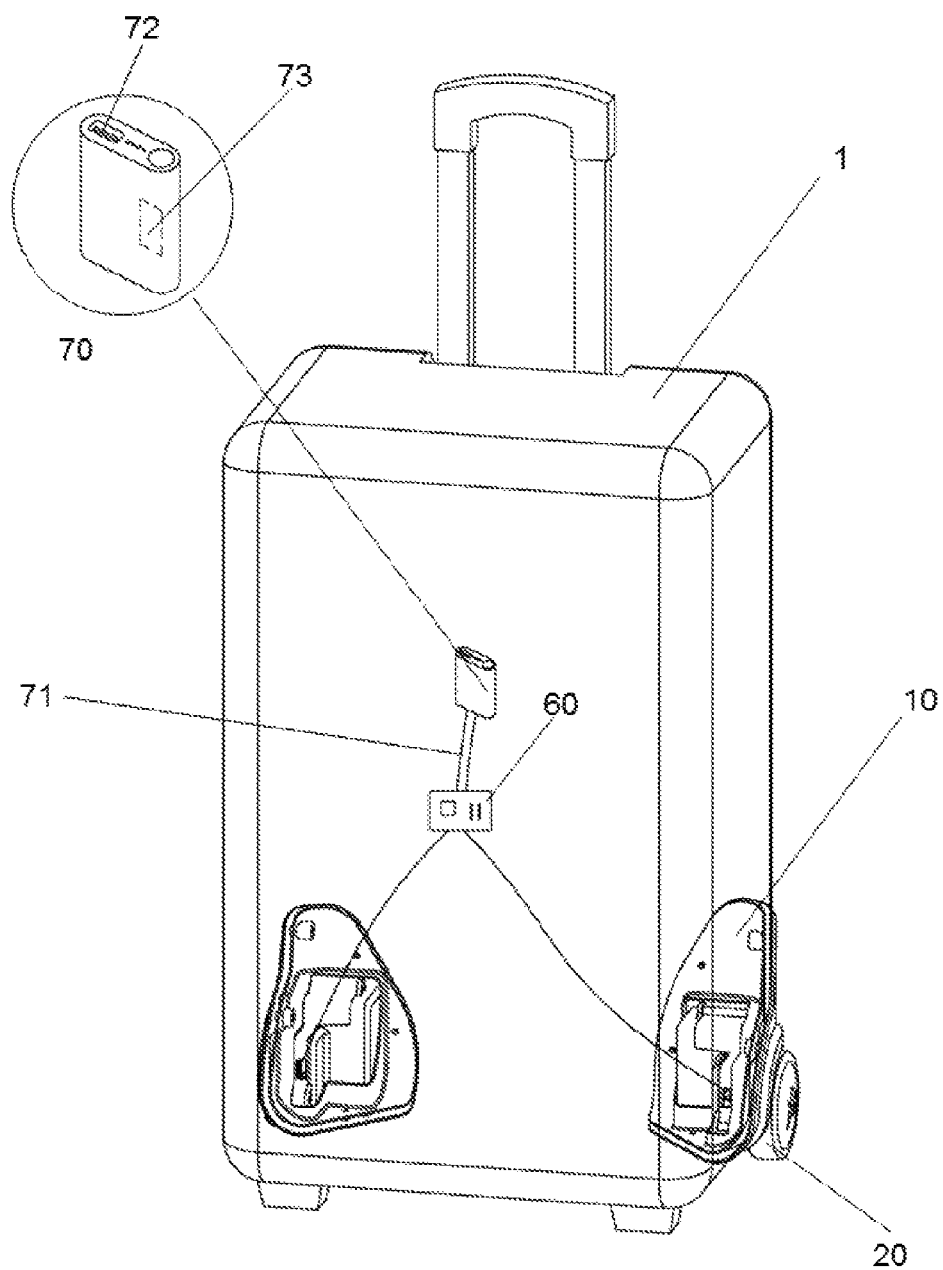
FIG. 1 is a structural schematic diagram of a suitcase with charging function in the first embodiment of the present invention.
Figure 2A:
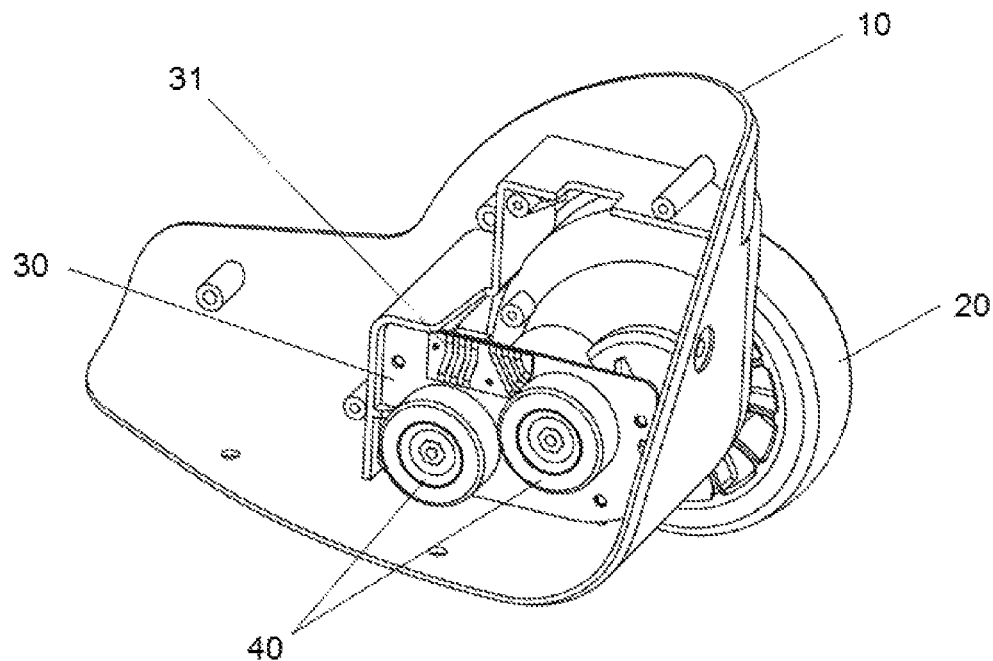
FIG. 2A and FIG. 2B are structural schematic diagrams of the roller bracket and other components after assembly in the first embodiment of the present invention.
Figure 2B:
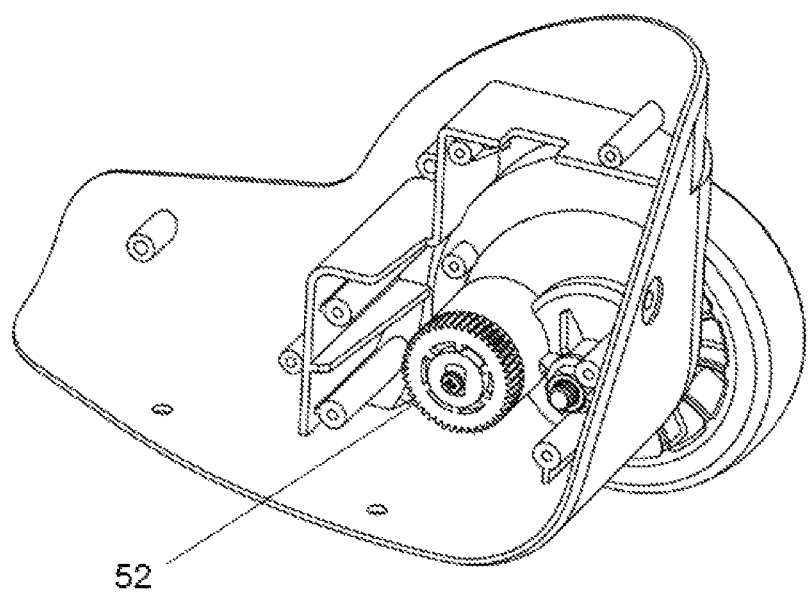

The suitcase with charging function provided by the present invention is applicable to 2-roller suitcases and 4-roller suitcases. Firstly, taking a 2-roller suitcase for example, as shown in FIG. 1~FIG. 5, the suitcase with charging function provided by the present invention, comprising: a suitcase body 1; two rollers 20; a current generating device disposed on at least one of the rollers 20; a PCB 60 connected to the current generating device and used to convert alternating current into direct current and regulate and stabilize voltage; a rechargeable battery 70 connected to the PCB 60 through wires 71. Wherein, the current generating device comprises: a roller bracket 10 fixed to the bottom of the suitcase body 1 and connected to the roller 20 through a roller shaft 25; a power generator fixing plate 30 fixed on the roller bracket 10 and having a generator PCB 31 and power lines 32, which is connected to the PCB 60; at least one power generator 40 fixed on the power generator fixing plate 30 and connected to the generator PCB 31; wherein there is a first gear 21 on the roller 20 and a second gear 41 on the shaft of the power generator 40, and the second gear 41 is engaged with the first gear 21 through transmission gears; the power generator can always effectively generate current when it rotates clockwise or anticlockwise. The rechargeable battery 70 is provided with a built-in circuit board 73 for stabilizing voltage and limiting current, and at least one output port 72 for charging various types of electronic products.

In this embodiment, every roller is provided with a current generating device, two power generators 40 are fixed on the power generator fixing plate 30, and all current generating devices are connected to the PCB 60 with wires and then connected to the rechargeable battery.

Figure 4A:
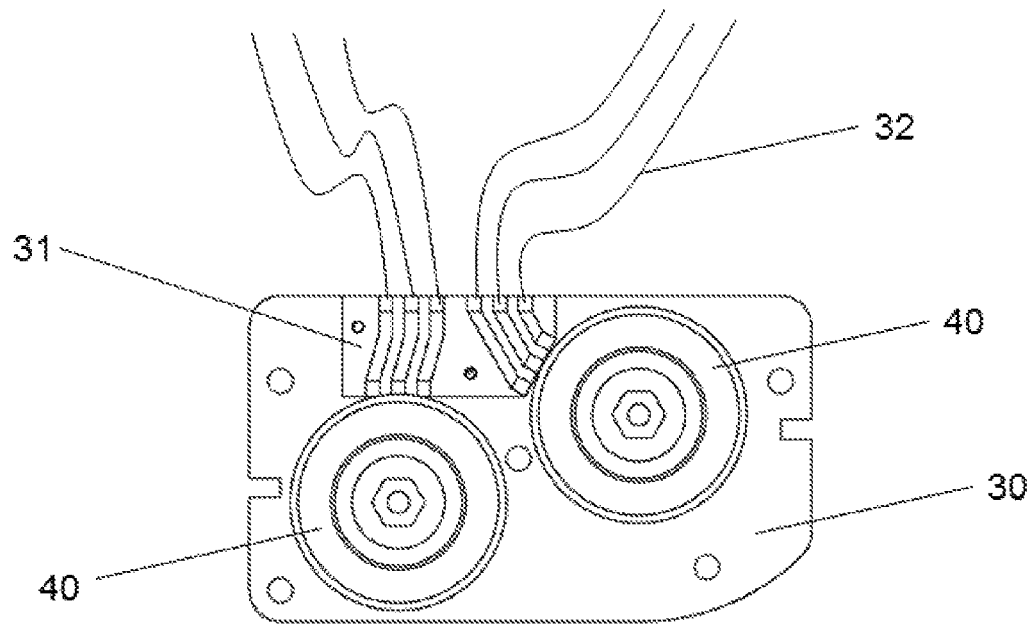
FIG. 4A and FIG. 4B are schematics of the rollers, transmission gears, power generators and other components in the first embodiment of the present invention on the front side back sides after assembly.
Figure 4B:
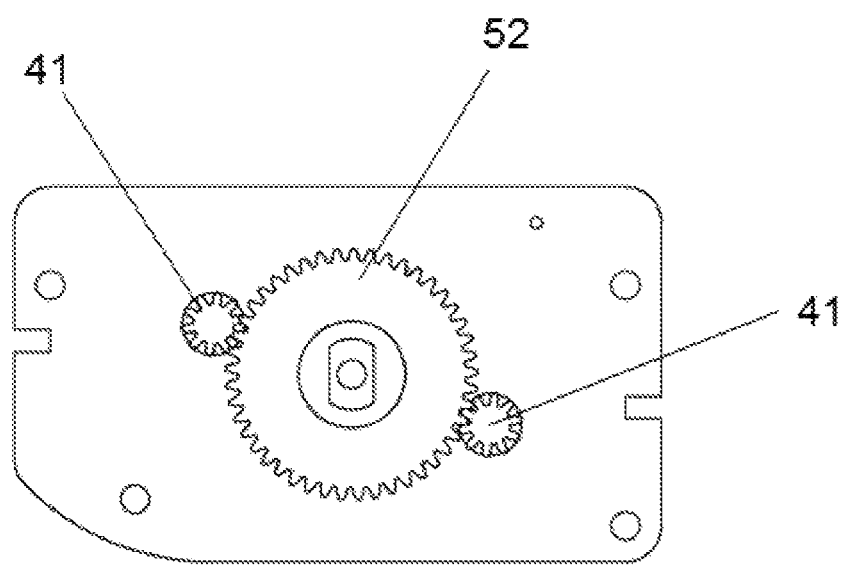
Figure 5:
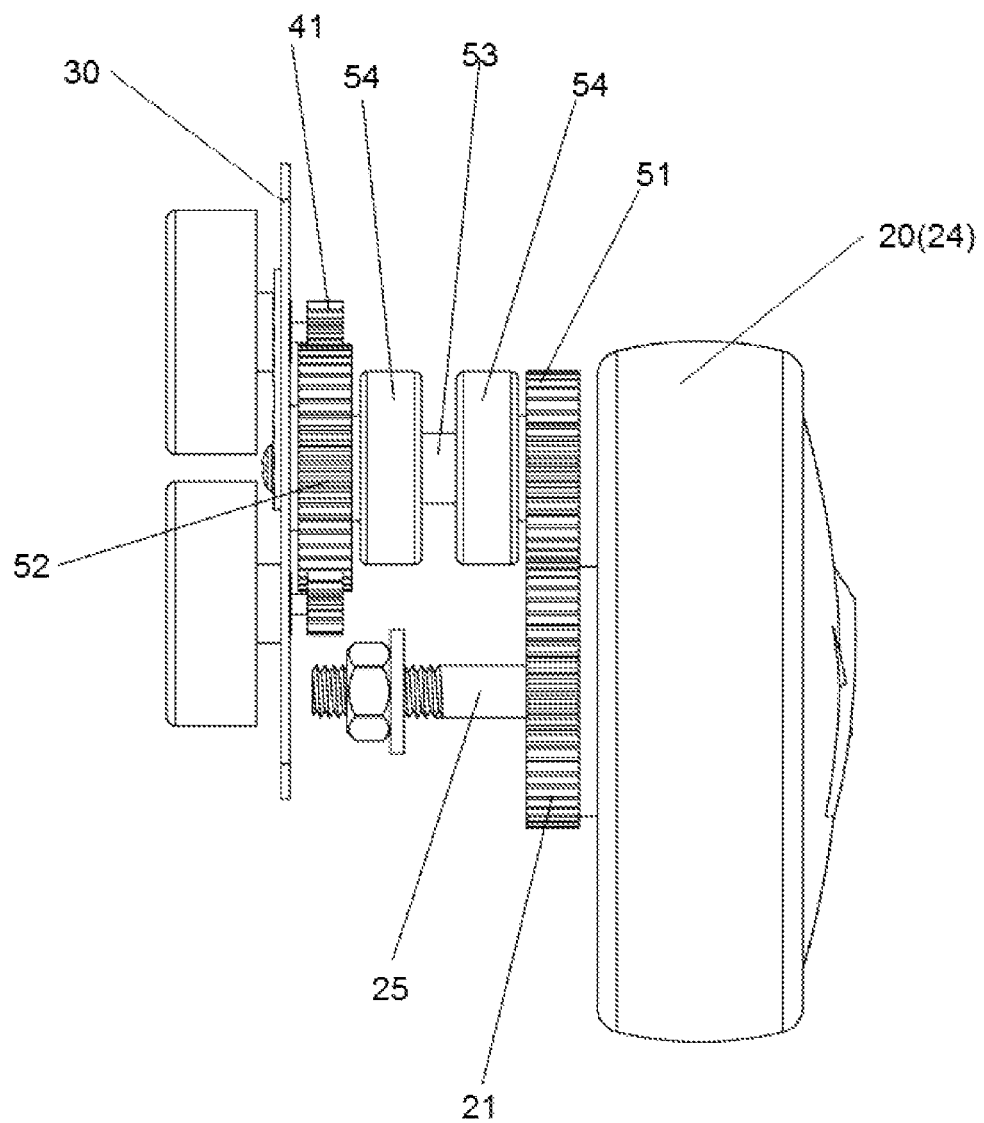
FIG. 5 is a structural schematic diagram for the connection of power generators to power generator fixing plate and rollers in the first embodiment of the present invention.
Figure 6:
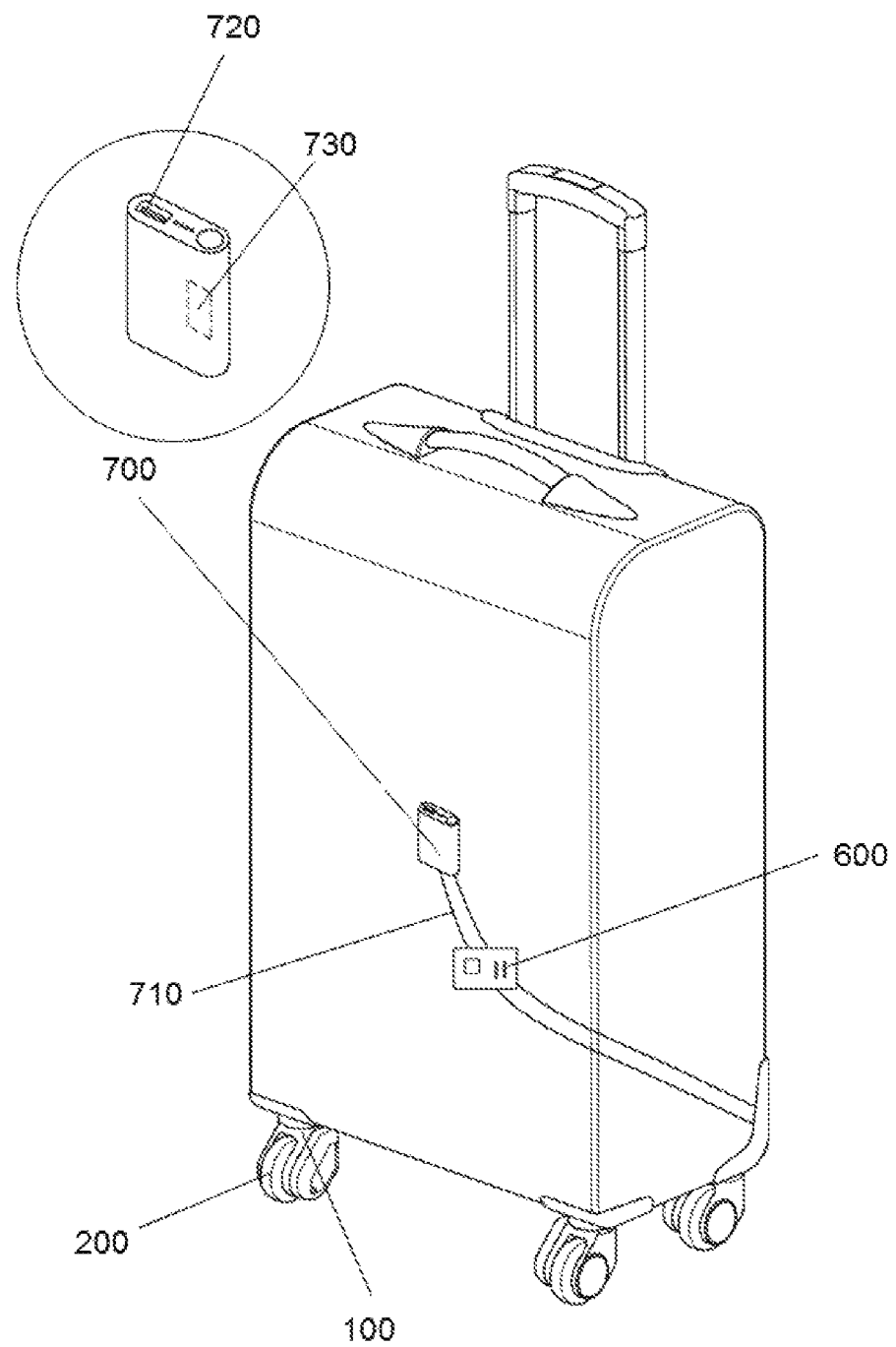
FIG. 6 is a structural schematic diagram of a suitcase with charging function in the second embodiment of the present invention.

As shown in FIG. 4, the power generator 40 and the second gear 41 are mounted on front and back sides of the power generator fixing plate 30 respectively, while the power generator 40 and the generator PCB 31 are on a same side of the power generator fixing plate 30.

In this embodiment, the transmission gears include: a first transmission gear 51 engaged with the first gear 21 on the roller 20; a second transmission gear 52 connected to the first transmission gear 51 through a connecting shaft 53 and engaged with the second gear 41 on the shaft of the power generator. As this embodiment adopts two power generators in the same time, the second transmission gear 52 should be engaged with the second gears 41 on the shafts of two power generators in the same time; the power generator 40 can always effectively generate current when it rotates clockwise or anticlockwise, so electricity will be generated whenever the suitcase is pulled forward or backward.

Specifically speaking, the connecting shaft 53 is fixed onto the power generator fixing plate 30 through a screw passing through the power generator fixing plate 30; one end of the connecting shaft 53 is provided with a surface matching the shape of the hole of the second transmission gear 52, and intended to be inserted into the hole of the second transmission gear 52 for fixing. There are also bearings 54 the quantity may be two. They are sleeved onto the connecting shaft 53. The provision of the bearings can make the wheels rotate more smoothly and significantly lengthen their service life.

Figure 3:
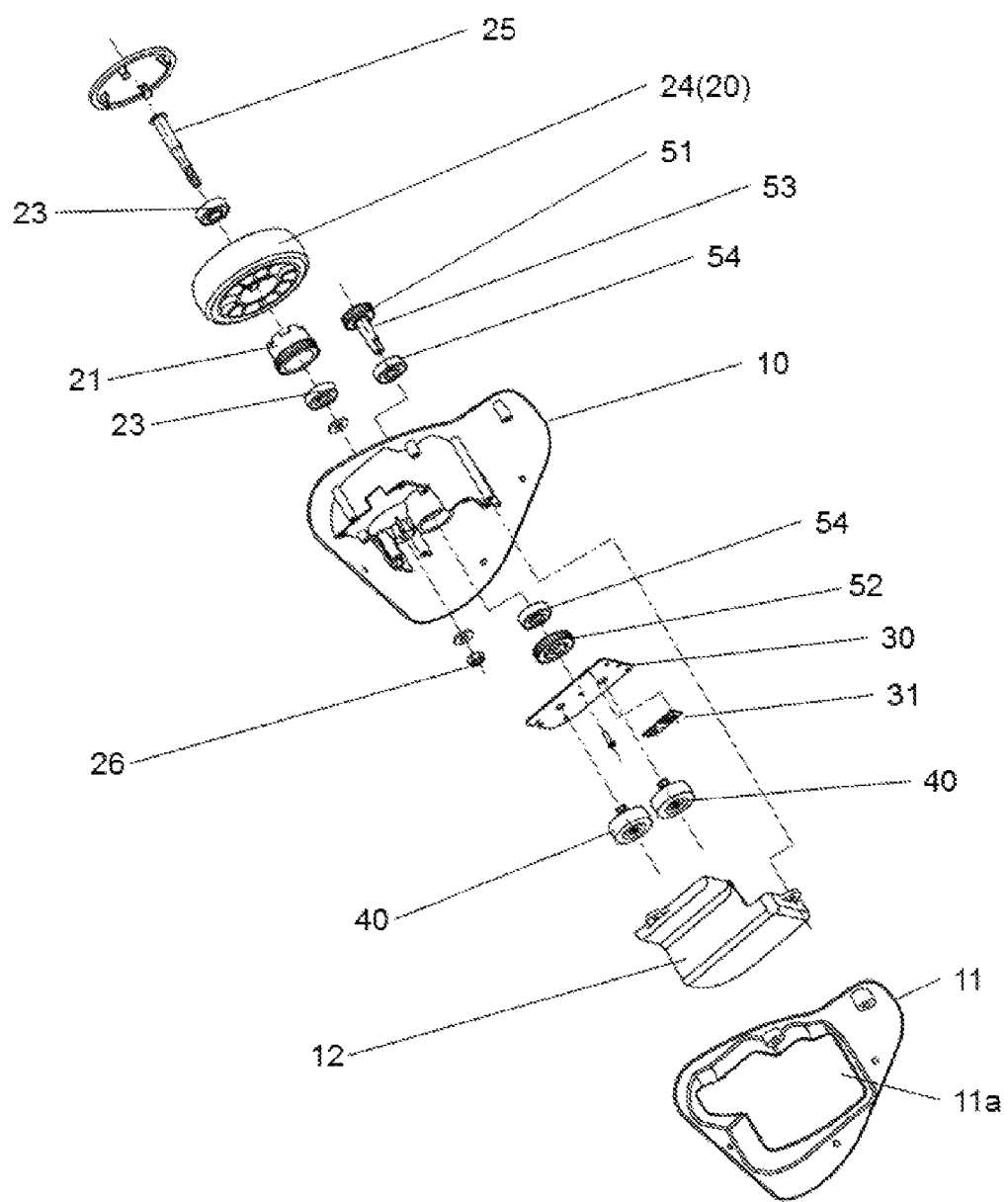
FIG. 3 is a structural schematic diagram of the roller bracket and other components in the first embodiment of the present invention before assembly.

As shown in FIG. 3, there is also a cover plate 12. The cover plate coordinates with the roller bracket 10 to form a space, which is used to receive and seal the power generator fixing plate 30, the power generator 40 and the transmission gears and prevent the intrusion of vapor and dust. In addition, there is also an installation part 11. There is a window 11a on the installation part 11. Through the window 11a, the roller bracket 10 is installed on the suitcase.

The roller 20 comprises a roller body 24 and bearings 23 on the two sides of the center hole of the roller body 24. The first gear 21 is directly inlaid and fixed onto the roller 20. The roller shaft 25 passes through the bearing 23, the roller body 24, the first gear 21, adjusting pieces and side wall of the roller bracket and is connected to the roller bracket 10 through a nut 26.

The foregoing first gear 21, transmission gears and second gear 41 constitute a gear system. Through detailed research, calculation and testing, this gear system can provide optimum transmission ratio, thereby ensuring current can be generated when the user carries the suitcase and walks whether he walks at a normal speed or runs at a high speed. Moreover, the effect is consistent with charging at home. Specifically speaking, at a normal walking speed, the gear system may make the power generator rotate at an ideal speed to generate power as much as a home charger. At a fast running speed, the power generator still can generate higher current within the range of the capacity of the power generator and avoid being damaged. In addition, the design of transmission gears can more effectively prevent water or dirt from destroying the power generator or PCB system.

The friction between rollers and ground is very important. If the friction is too small, the rollers will "slide". This means it cannot actuate the power generators and cannot generate electric power. In order to improve friction, the rollers in the present invention adopt a high-friction material to generate enough grip with the ground. Owing to the design of the gear system, the movement mechanism as a whole has small friction (internal resistance). Consequently, the luggage can be moved forward or backward easily.

Figure 16:
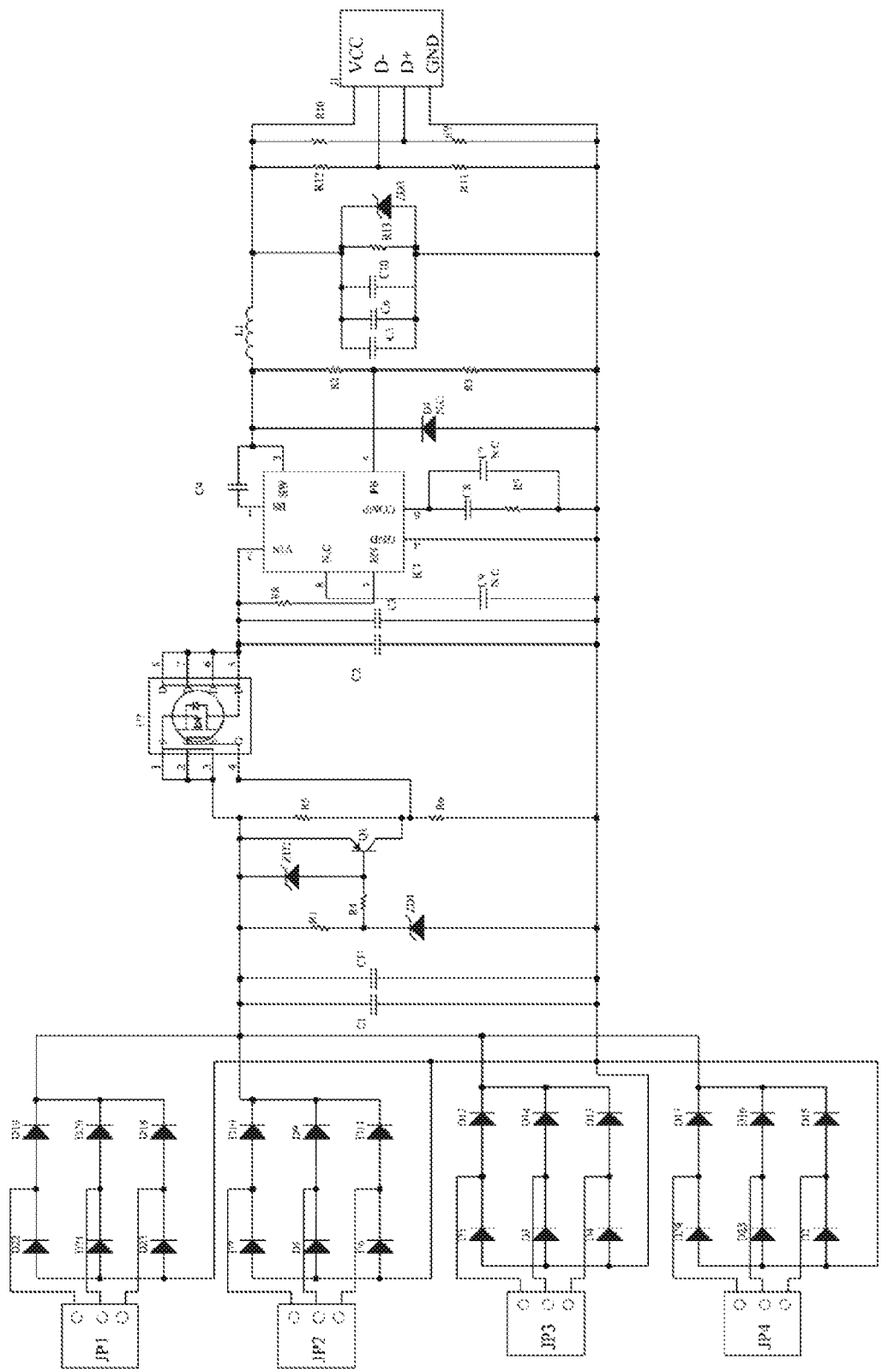
FIG. 16 is a circuit diagram of the converter and regulator of the PCB in the present invention.
Figure 17:
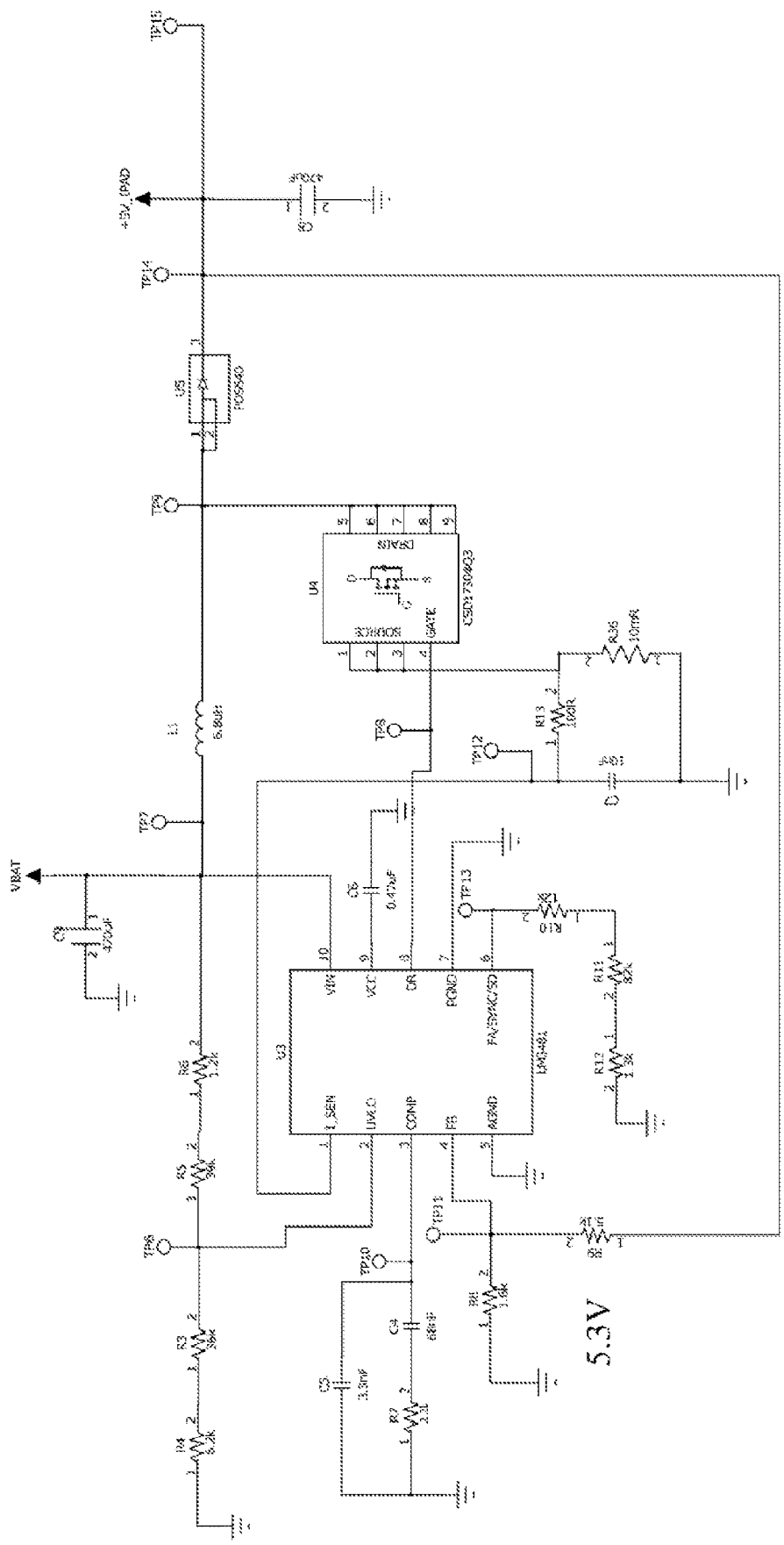
FIG. 17 is the stabilizing voltage circuit diagram of the built-in circuit board in the present invention.
Figure 18A:
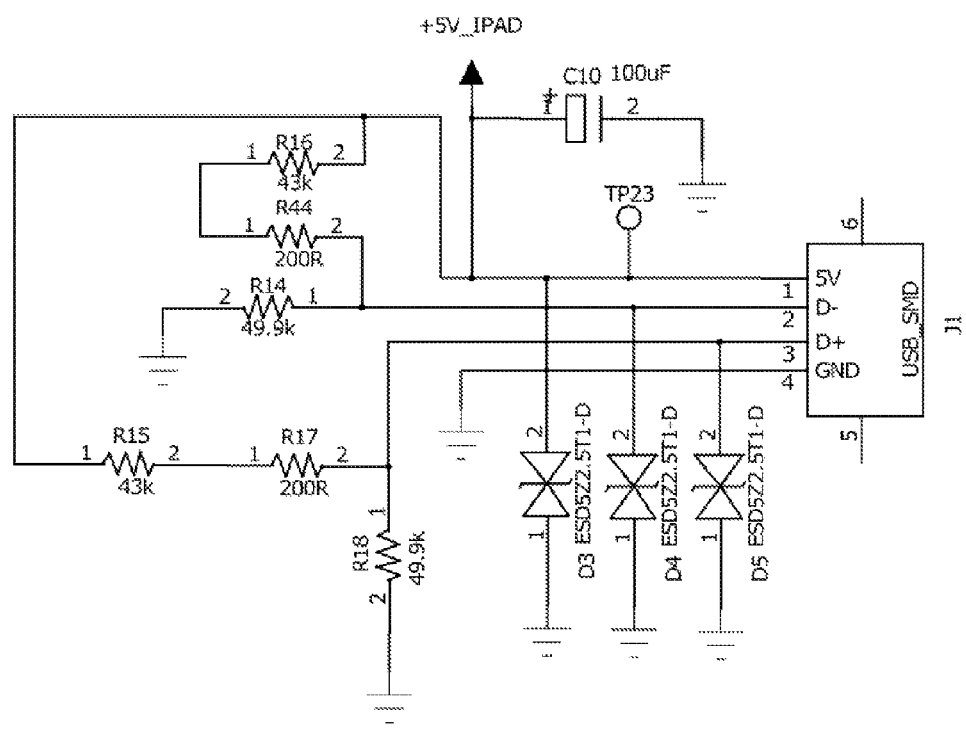
FIGS. 18a and 18b are the limiting current circuit diagram of the built-in circuit board in the present invention.
Figure 18B:
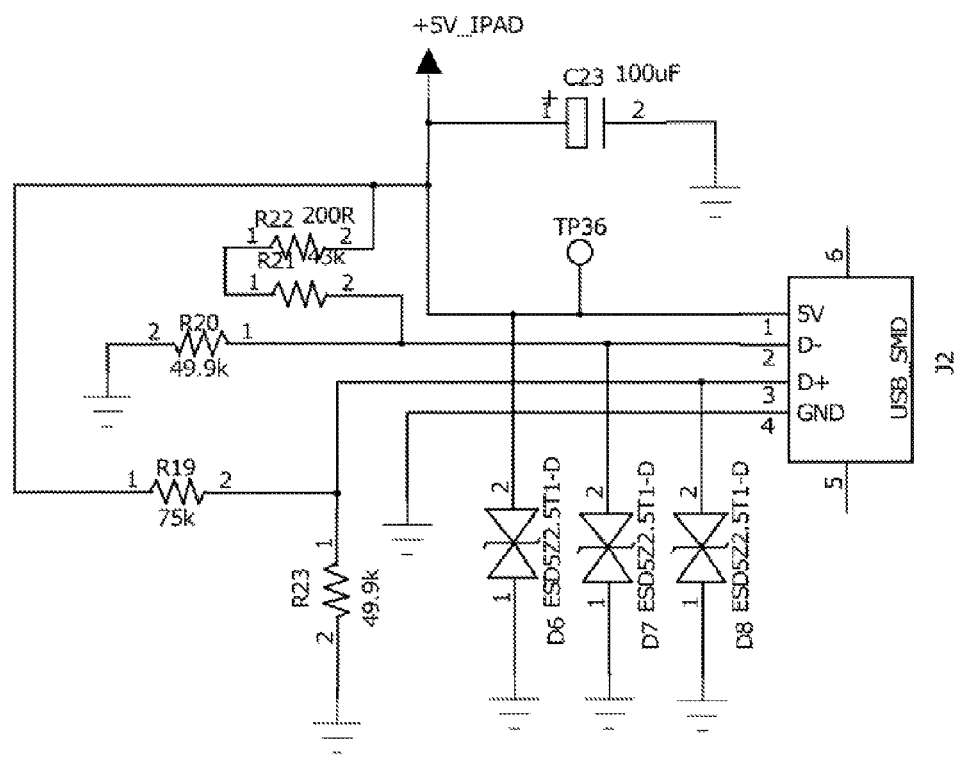

The current generated by the power generator 40 will be sent to the PCB 60 at first. There the current will be regulated and stabilized and alternating current will be converted into direct current at first. The circuit diagram of the converter and the regulator is shown in FIG. 16. Then it is delivered to the rechargeable battery. The built-in circuit board 73 of the rechargeable battery 70 plays a role in stabilizing voltage and limiting current. The stabilizing voltage circuit diagram of the built-in circuit board 73 is shown in FIG. 17 and the limiting current circuit diagram of the built-in circuit board 73 is shown in FIGS. 18a and 18b. The above protective means prevents damage of the rechargeable battery 70 and make charging safer.

Although it is not shown in the diagrams, the suitcase with charging function provided by the present invention also comprises a battery compartment (not shown in the diagrams). It is inside suitcase body 1 and intended to receive the rechargeable battery 70. The battery compartment is provided with a shock absorbing layer, which is used to prevent vibration or collision from damaging the rechargeable battery 70. The rechargeable battery 70 may be taken out from the battery compartment so that the rechargeable battery 70 can be used when the user does not need to carry the suitcase with charging function.

Below a 4-roller suitcase is taken for example to introduce the suitcase with charging function provided by the present invention. Please refer to FIG. 6~FIG. 10. In this embodiment, the suitcase with charging function comprises: a suitcase body, four rollers, and at least one current generating device, disposed on at least of one rollers. The current generating device is connected to a PCB 600 through wires at first and then connected to a rechargeable battery. Wherein, the current generating device comprises: a roller bracket 100 fixed to the bottom of the suitcase body and connected to a roller 200 through a roller shaft 230; a power generator fixing plate 300 fixed on the roller bracket 100 and having a generator PCB 310 and power lines 320; a power generator 400 fixed on the power generator fixing plate 300 and connected to the generator PCB 310. Wherein, there is a first gear 210 on the roller 200 and a second gear 410 on a shaft of the power generator 400 and the second gear 410 is directly engaged with the first gear 210. The PCB 600 is used to convert alternating current into direct current and regulating and stabilizing voltage and connected to the power lines 320 led out from the generator PCB 310.

The rechargeable battery 700 is connected to the PCB 600 through wires 710. The rechargeable battery 700 has a built-in protective circuit board 730 for stabilizing voltage and limiting current, and at least one output port 720 for charging different electronic devices.

In this embodiment, every roller is provided with the current generating device. All current generating devices are connected to the PCB 600 at first and then connected to the rechargeable battery 700.

Figure 7:
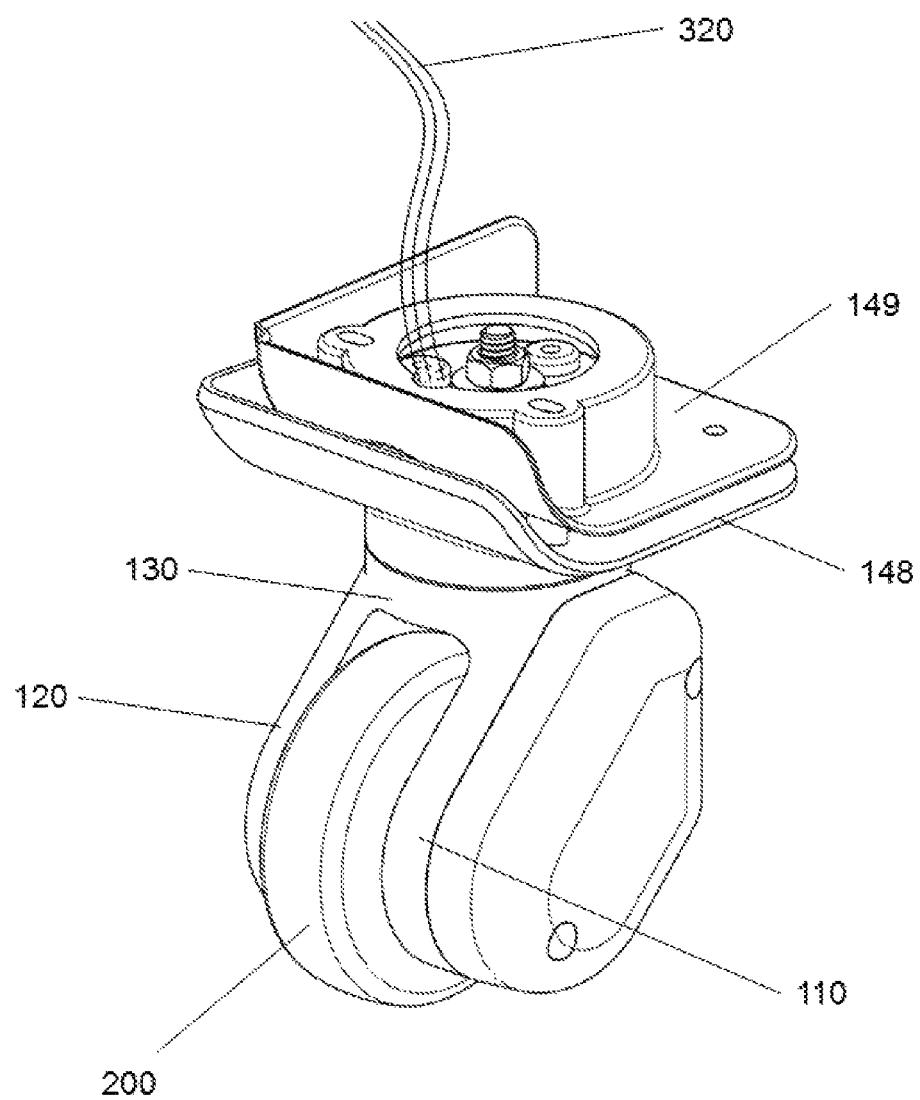
FIG. 7 is a structural schematic diagram of the roller bracket and other components in the second embodiment of the present invention after assembly.
Figure 8:
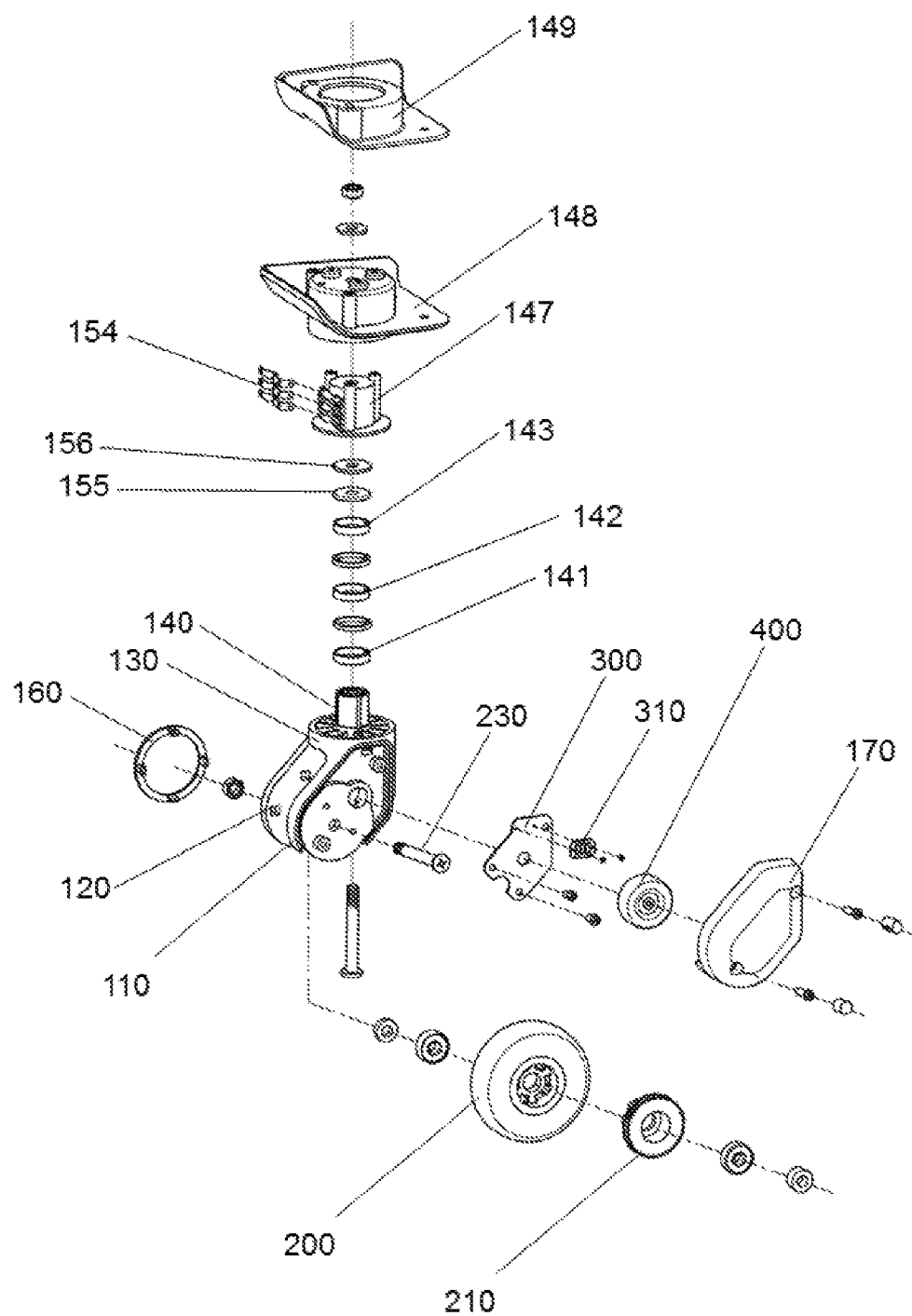
FIG. 8 is a structural schematic diagram of the roller bracket and other components in the second embodiment of the present invention before assembly.
Figure 9:
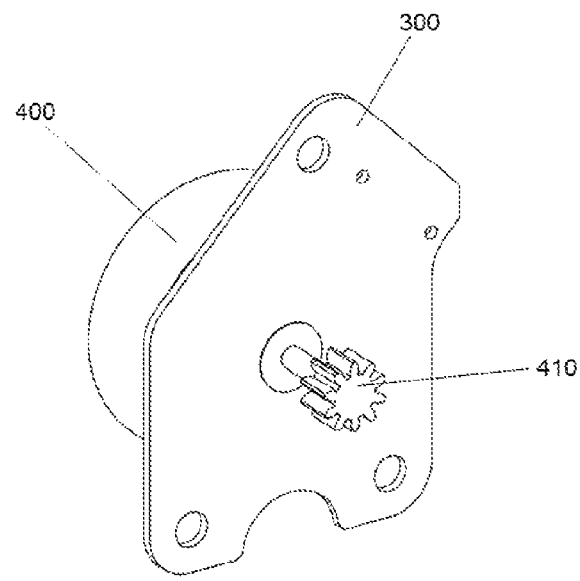
FIG. 9 is a structural schematic diagram for the connection between power generators and power generator fixing plate in the second embodiment of the present invention.

As shown in FIG. 9, the power generator 400 and the second gear 410 are on the front and back sides of the power generator fixing plate 300 respectively and the second gear 410 is located on the inner side of a first clamping plate 110, while the power generator 400 and the generator PCB 310 are on a same side of the power generator fixing plate 300. In this embodiment, as shown in FIG. 7 and FIG. 8, the roller bracket 100 comprises relatively disposed the first clamping plate 110 and a second clamping plate 120 as well as a fixing plate 130 connecting the first clamping plate 110 and the second clamping plate 120. The roller 200 is between the first clamping plate 110 and the second clamping plate 120, while a fixing plate 130 is above the roller 200. A roller shaft 230 passes through the first clamping plate 110, the first gear 210, the roller 200 and the second clamping plate 120. The power generator fixing plate 300 may be fixed onto the first clamping plate 110 through a screw or by other methods. There is also a central shaft lever 150, which passes through the fixing plate 130 and the bottom of the suitcase body and is used to fix the roller bracket 100 to the bottom of the suitcase body.

In this embodiment, there are a plurality of fixing holes on the rim of the roller 200. On the first gear 210, there are a plurality of corresponding plug-in pieces, which are intend to be inserted into the fixing holes, thereby fixing the first gear 210 onto the roller 200.

The roller 200 is between the first clamping plate 110 and the second clamping plate 120. The first gear 210 is located in a groove on the inner side of the first clamping plate 110 and engaged with the second gear 410 directly.

Figure 10:
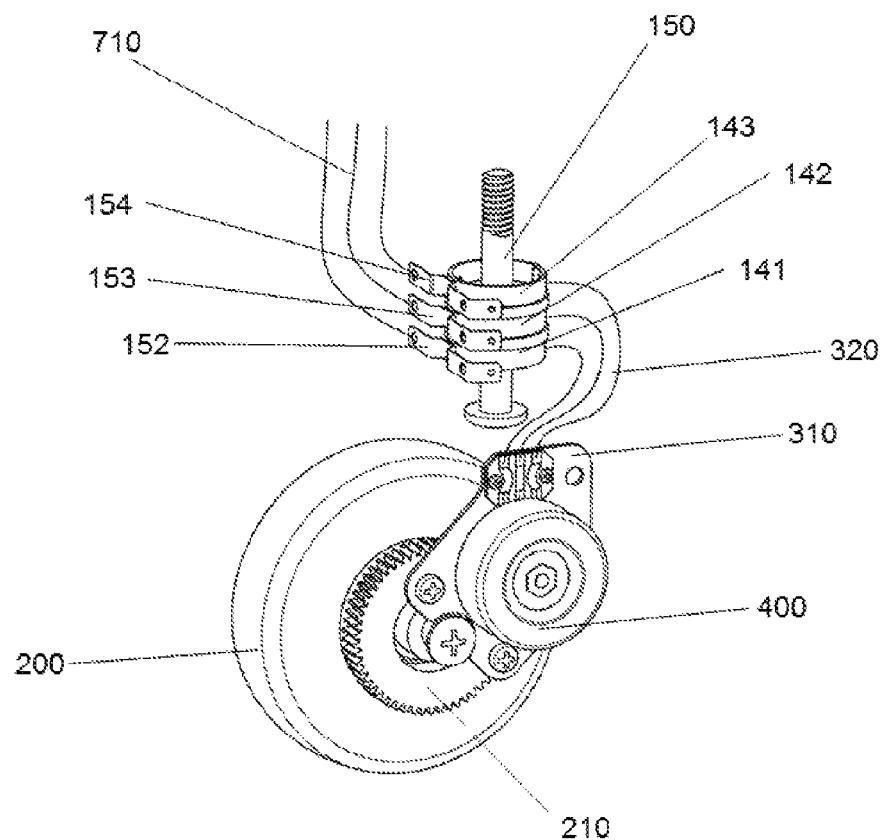
FIG. 10 is a schematic for assembly of power generators, rollers and wire anti-intertwining modules in the second embodiment of the present invention.

In order to prevent the influence of vapor and dust, there is also: a first cover 170, connected to the first clamping plate 110 through screws and used to cover the power generator 400 and the power generator fixing plate 300; a second cover 160, snapped into the through hole on the second clamping plate 120 by a snap on it, thereby being connected to the second clamping plate 120. Besides, the positions of the power generator 400 and the generator PCB 310 are higher than the center of the roller 200 (as shown in FIG. 10). It can further prevent water or dust from destroying the system. In fact, the first clamping plate 110 per se also has a function of obstructing water and dust from destroying the system.

In this embodiment, there is also a wire anti-intertwining module, inside the suitcase body. From bottom to top, the central shaft lever 150 passes through the fixing plate 130, the wire anti-intertwining module and a top cover 148 in turn. The top cover 148 is fixed at the bottom of the suitcase body. There is also an inner cap 149. It is disposed on the top cover 148. At the bottom of the suitcase body, a space facing the internal concave is reserved in a position corresponding to the wire anti-intertwining module and is used to receive the wire anti-intertwining module.

In this embodiment, the wire anti-intertwining module comprises: a convex piece 140, disposed on the fixing plate 130 and extended to the internal part of the suitcase body; a plurality of ring-shaped contact parts 141, 142 and 143, encircling and fixed onto the convex piece 140 and connected by the power lines 320 led out from the generator PCB 310; a seal cover 147, for covering the convex piece 140 and embracing the ring-shaped contact parts 141, 142 and 143 of the convex piece 140; spring pieces 152, 153 and 154 fixed onto the seal cover 147. One end of each of the spring pieces 152, 153 and 154 passes through the seal cover 147 and contacts a corresponding ring-shaped contact part among the ring-shaped contact parts 141, 142 and 143 and the other end is connected to wires 710 connected to the PCB. More preferably, it also includes at least one washer 155 or 156, between the convex piece 140 and the inner upper end of the seal cover.

Figure 11:
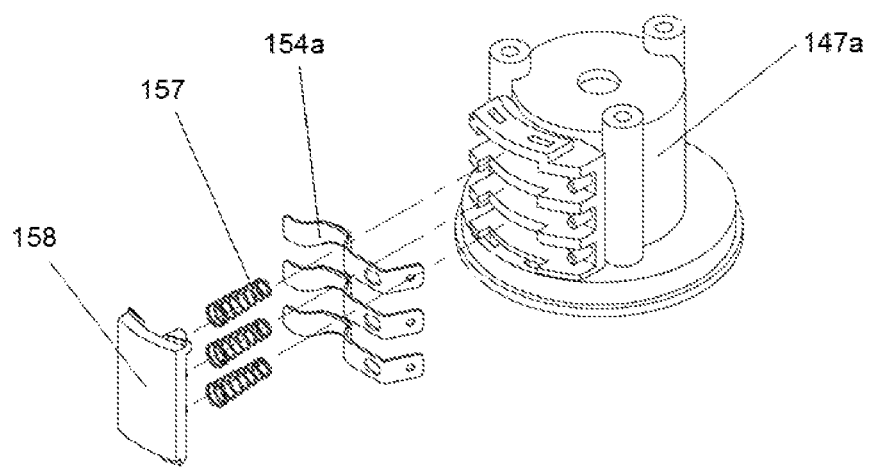
FIG. 11 is a schematic for the assembly of another embodiment of the wire anti-intertwining module in the present invention.
Figure 12:
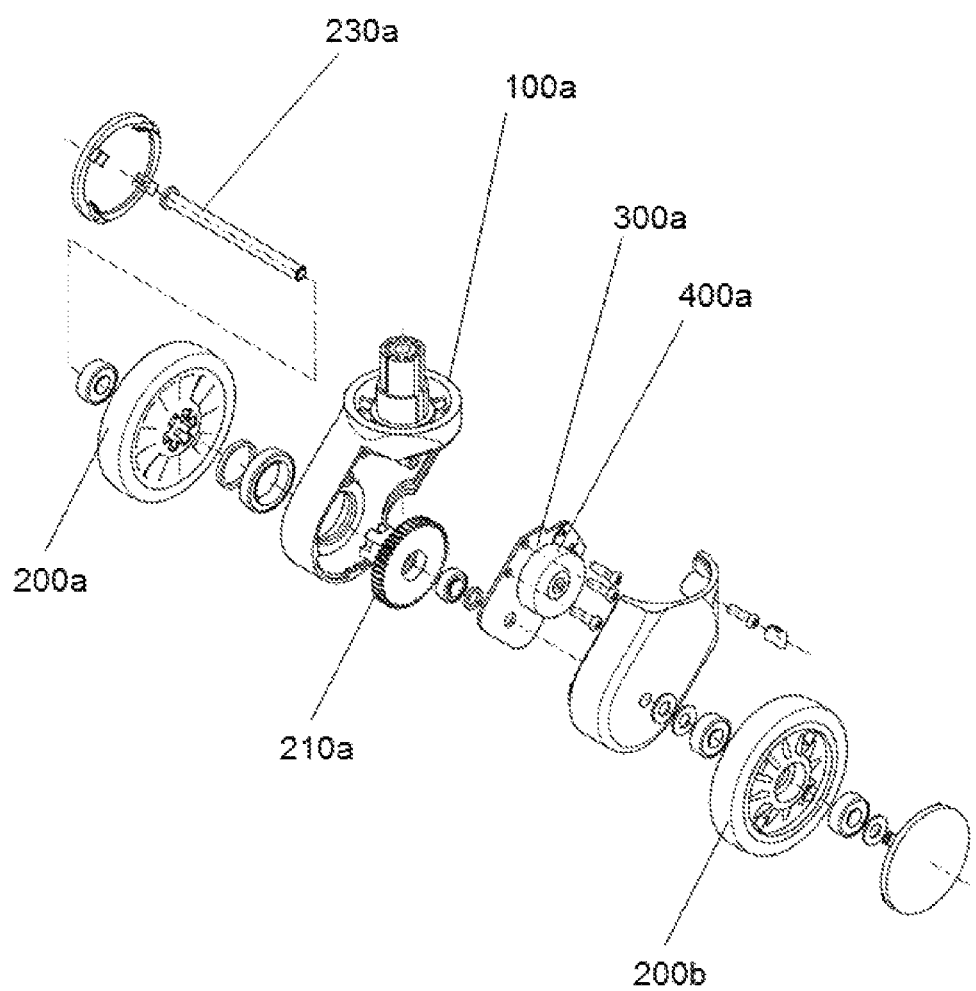
FIG. 12 is a schematic of a roller bracket and other components of the suitcase with charging function in the third embodiment of the present invention before assembly.

As a modification of the foregoing embodiment, as shown in FIG. 11, it also comprises spiral spring parts 157 matched with the spring pieces. Every spiral spring part is fixed to a spring piece through a fixing part 158. This design may make every spring piece more frequently contact every ring-shaped contact part without too much resistance.

In the foregoing embodiment of a 4-roller suitcase, rollers 200 may rotate along the central shaft lever 150 clockwise or anticlockwise by 360°, and power lines 320 carrying electricity generated by the power generator are connected to the bottom of the first ring-shaped contact part 141, the second ring-shaped contact part 142 and the third ring-shaped contact part 143. The spring pieces 152, 153 and 154 pass through the seal cover and contact corresponding the first ring-shaped contact part 141, the second ring-shaped contact part 142 and the third ring-shaped contact part 143. As the elastic force of the spring pieces are carefully calibrated, they can often contact the ring-shaped contact parts without generating too much resistance. Another ends of spring pieces 152, 153 and 154 are connected to extended wires 710. The wires 710 transport current to the PCB. Here alternating current will be converted into direct current and voltage will be regulated and stabilized and then the current is delivered to the rechargeable battery 700. The built-in circuit board 730 of the rechargeable battery 700 plays a role in stabilizing voltage and limiting current. The foregoing design ensures wires won't be intertwined and can be effectively connected to the rechargeable battery and transfer current to the rechargeable battery without stop no matter which direction rollers 200 rotate to.

The foregoing protective means can effectively prevent damage of the rechargeable battery 700 and make charging safer.

Although it is not shown in the diagrams, the suitcase with charging function provided by the present invention also comprises a battery compartment. It may be arranged in any appropriate position inside the suitcase body to receive the rechargeable battery 700. The battery compartment is provided with a shock absorbing layer, which is used to prevent vibration or collision from damaging the rechargeable battery 700. The rechargeable battery 700 may be taken out from the battery compartment so that the rechargeable battery 700 can be used when the user does not need to carry the suitcase with charging function.

Figure 13:
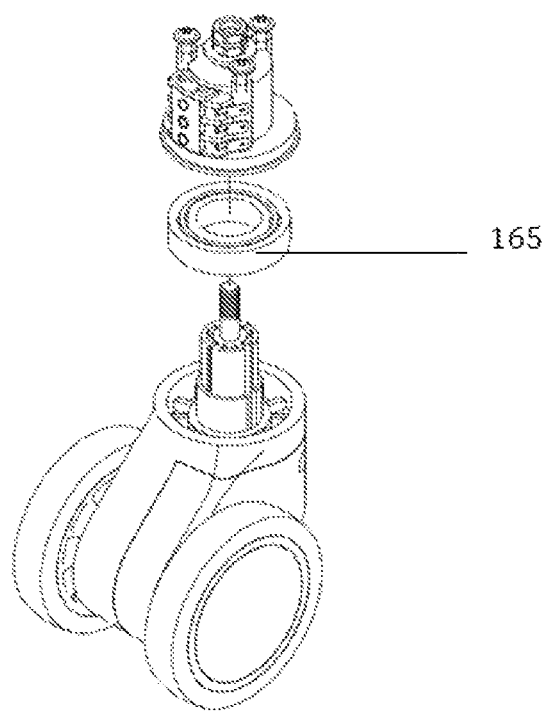
FIG. 13 is a schematic of the bearing disposed between the fixing plate of the roller bracket and the seal cover of the wire anti-intertwining module in the second and third embodiments of the present invention.

FIG. 13 shows another embodiment of suitcase with charging function in the present invention. It is a modification of the foregoing 4-roller suitcase. It comprises: a suitcase body and four groups of rollers and every group of rollers is provided with a current generating device. These current generating devices are connected to a PCB through wires and then connected to a rechargeable battery. Every group of rollers has two rollers. Wherein the current generating device comprises: a roller bracket 100a, fixed to the bottom of the suitcase body and connected to every group of rollers through a roller shaft 230a; a power generator fixing plate 300a fixed on the roller bracket 100a and having a generator PCB and power lines; a power generator 400a fixed on the power generator fixing plate 300a and connected to the generator PCB, wherein the two rollers 200a and 200b in each group are located on the two sides of the roller bracket 100a, there is a first gear 210a on one roller 200a and a second gear (not shown in the diagrams) on the power generator 400a, and the second gear is directly engaged with the first gear 210a. The PCB is used to convert alternating current into direct current and regulating and stabilizing voltage, and connected to the power lines led out from the generator PCB, and connected to the rechargeable battery through wires. In this embodiment, the power generation principle of every current generating device is basically the same as that described in the foregoing embodiments. Only it has one more roller, used for decoration or good look.

The suitcase with charging function provided by the present invention drives the first gear and second gear to rotate through the rotation of rollers, thereby making the power generators generate power. Moreover, it provides optimum transmission ratio, raises current and makes output continuous. In addition, it can also reduce friction to make for the movement of the suitcase by push or pull. The current generated by power generators realizes AC-to-DC conversion, regulation and stabilization through the PCB and then is charged into the rechargeable battery. The rechargeable battery is provided with a built-in circuit board, which plays a role in stabilizing voltage and limiting current. The foregoing protective means may effectively assure charging safety. Through multiple outputs, the rechargeable battery can charge different electronic devices in the same time. Rollers are made of high-friction material and can effectively grip the ground. Different damp-proof and dust-proof technical means are provided for 2-roller suitcase and 4-roller suitcase respectively to prevent damage of the whole charging system.

Optionally, in the foregoing 4-roller/roller-group embodiments, a bearing 165 may be arranged between the fixing plate of the roller bracket and the seal cover of the wire anti-intertwining module, as shown in FIG. 13, it may reduce friction force (internal resistance) generated when rollers rotate by 360 degrees, thereby making the pulling of the suitcase more smoothly and improving power generation efficiency.

Figure 14:
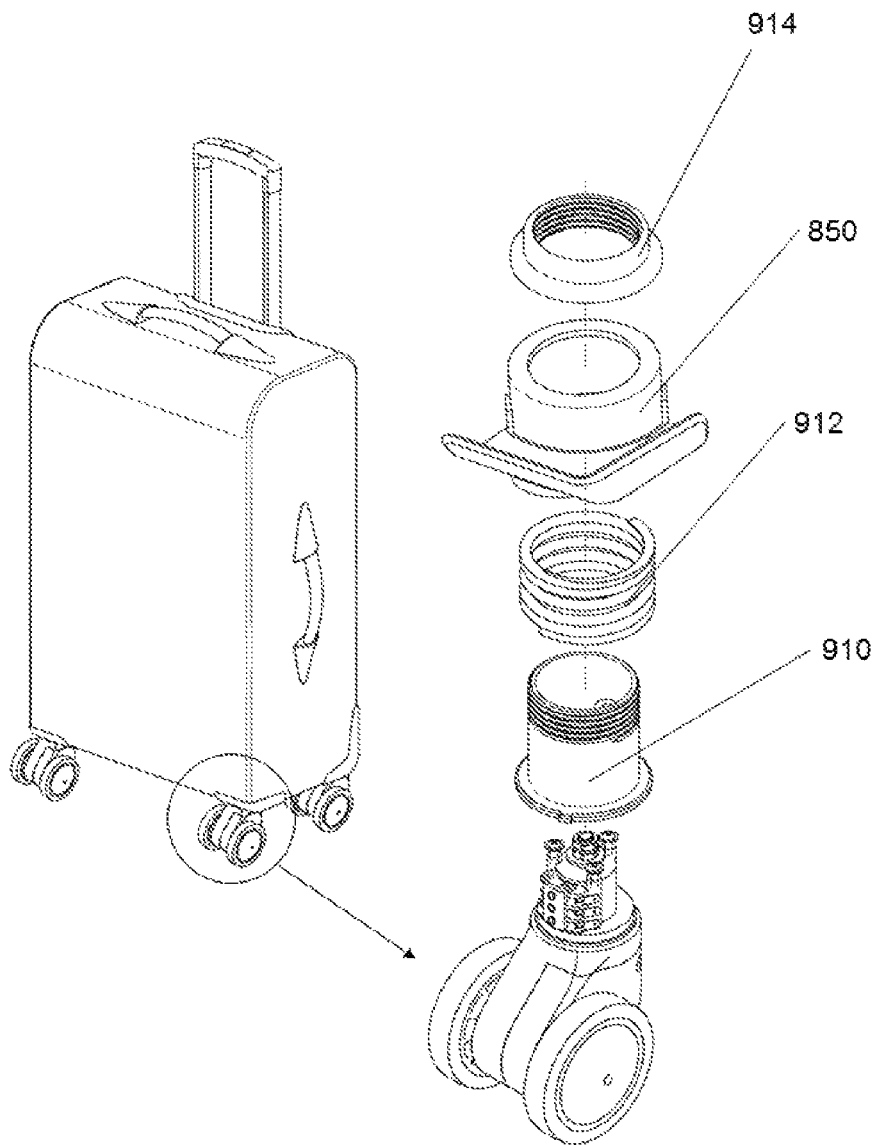
FIG. 14 is a schematic of the suspension spring disposed between the roller bracket and suitcase bottom in the second and third embodiments of the present invention.

When the suitcase is shaken, in order to prevent damage of the roller bracket, a shock absorbing spring part 912 may be arranged between the roller bracket and the suitcase body, as shown in FIG. 14. In the embodiment shown in FIG. 14, a cylindrical top cover 910 is disposed on the roller bracket. The upper end of the top cover is provided with external thread. The shock absorbing spring part 912 is mounted on the cylindrical top cover 910. At the bottom of the suitcase body, a mounting rack 850 with a through hole is disposed and used to mount the roller bracket on the suitcase body. The top cover 910 is inserted into the through hole of the mounting rack 850 and combined with a fixing part 914 having internal thread, thereby making the roller bracket fixed at the bottom of the suitcase body. Of course, the roller bracket installed with shock absorbing spring parts may also be fixed onto the suitcase body by other methods commonly used in the art.

Figure 15:
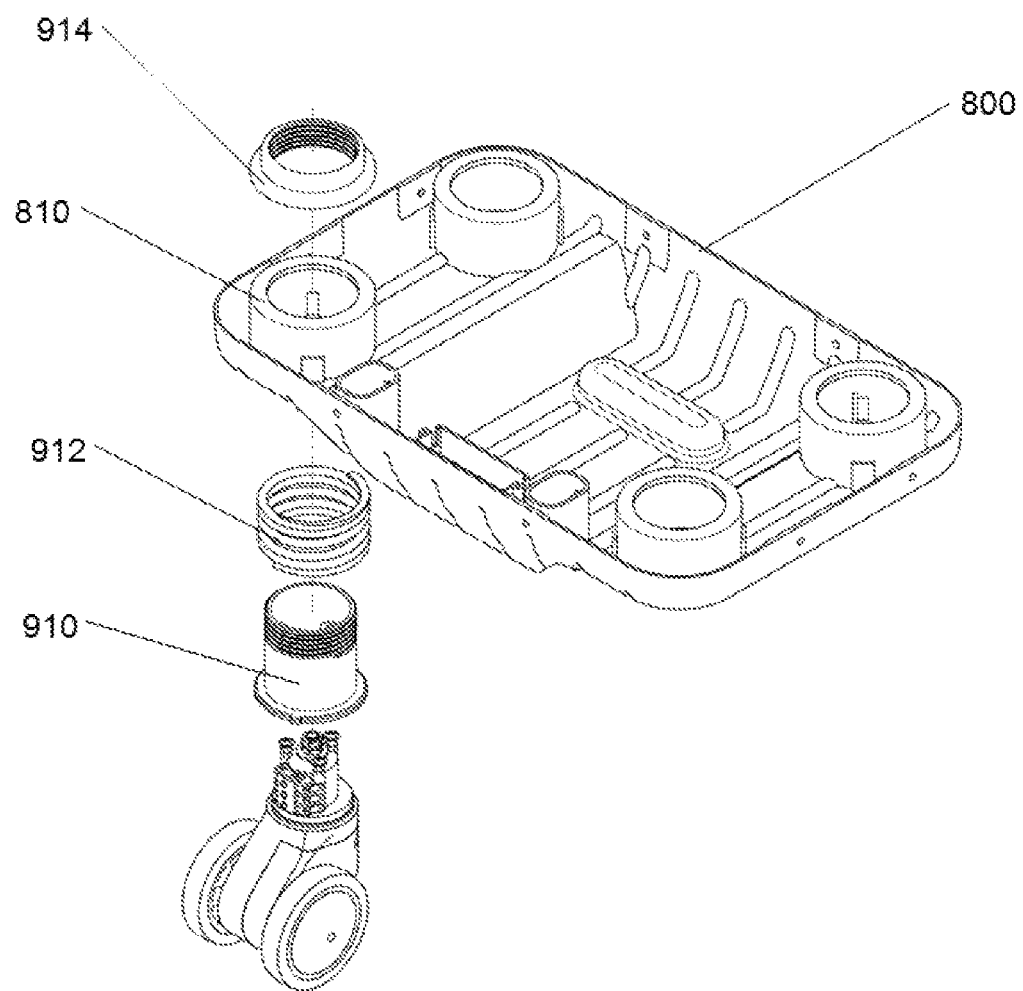
FIG. 15 is a structural schematic diagram for connection between the chassis of the suitcase with charging function and the roller bracket module in the present invention.

In order to raise the strength or stability of suitcase bottom, a chassis 800 may be arranged at the bottom of the suitcase body, as shown in FIG. 15. Every/every group of rollers is fastened on the chassis 800 by a way of that the cylindrical top cover 910 having external thread at the top is connected to the fixing part 914 which is on a chassis mounting hole 810 and has internal thread. Alternatively, a shock absorbing spring 912 may be arranged between the cylindrical top cover 910 and the chassis 800. This can effectively reduce the damage of the suitcase from collision in case of fall by accident.

Above the preferred embodiments of the present invention are described by referring to accompanying drawings. Without departing from the scope and essence of the present invention, those skilled in the art may adopt various modified schemes to realize the present invention. For example, the features partially presented or described in an embodiment may be used in another embodiment to obtain another embodiment. The above embodiments are only preferred and feasible embodiments of the present invention and won't limit the scope of claim of the present invention. All the equivalent changes made by applying the description and drawing content of the present invention all are included in the scope of claim of the present invention.

What is claimed is:

1. A suitcase with charging function, comprising:
   a suitcase body;
   at least two rollers disposed at bottom of the suitcase body;
   a current generating device disposed on one of the rollers and used to generate current by converting rotational motion of the roller into electrical power;
   a PCB connected to the current generating device and used to convert alternating current into direct current and regulate and stabilize voltage; and
   a rechargeable battery connected to the PCB through wires;
   wherein the current generating device comprises:
      a roller bracket fixed to the bottom of the suitcase body and connected to the roller through a roller shaft;
      a power generator fixing plate fixed on the roller bracket and having a generator PCB and power lines;
      at least one power generator fixed on the power generator fixing plate and connected to the generator PCB;
   wherein the roller connected to the roller shaft has a first gear and a shaft of the power generator has a second gear, and the second gear is engaged with the first gear directly or through transmission gears; the power generator effectively generating current no matter it rotates clockwise or anticlockwise; the current generating device working normally even though each of the roller moves at different speed and in different directions;
   wherein the rechargeable battery comprises a built-in circuit board for stabilizing voltage and limiting current, and comprises at least one output port for charging various types of electronic products;
      wherein number of the rollers is four, and each of the roller is provided with the current generating device;
      wherein the roller bracket comprises a first clamping plate and a second clamping plate which are relatively disposed, as well as a fixing plate connecting the first clamping plate and the second clamping plate; the roller being between the first clamping plate and the second clamping plate, the fixing plate being above the roller; the roller shaft passing through the first clamping plate, the first gear on the roller, the roller and the second clamping plate in turn; the power generator fixing plate being fixed on an outer side of the first clamping plate; the roller bracket further comprising a central shaft lever passing through the fixing plate and the bottom of the suitcase body and used to fix the roller bracket to the bottom of the suitcase body;
   wherein a shock absorbing spring part is arranged between the roller bracket and the bottom of the suitcase body.

2. The suitcase with charging function according to claim 1, wherein the power generator and the second gear are on front and back sides of the power generator fixing plate respectively.

3. The suitcase with charging function according to claim 1, wherein the power generator and the generator PCB are on a same side of the power generator fixing plate.

4. The suitcase with charging function according to claim 1, wherein the power generator fixing plate comprises two power generators, and the second gear is engaged with the first gear through the transmission gear.

5. The suitcase with charging function according to claim 4, wherein the transmission gears comprises: a first transmission gear engaged with the first gear on the roller; and a second transmission gear connected to the first transmission gear through a connecting shaft and simultaneously engaged with the second gears on the shafts of the two power generators.

6. The suitcase with charging function according to claim 5, wherein the connecting shaft is fixed on the power generator fixing plate through a connecting piece; an end of the connecting shaft having a surface matched with shape of a hole of the second transmission gear, for inserting into the hole of the second transmission gear; the suitcase with charging function further comprising at least one bearing sleeved onto the connecting shaft.

7. The suitcase with charging function according to claim 1, further comprising a cover plate, the cover plate and the roller bracket forming a closed space; the power generator fixing plate, the power generator and the transmission gear being inside the closed space.

8. The suitcase with charging function according to claim 1, further comprising an installation part for installing the roller bracket onto the suitcase body.

9. The suitcase with charging function according to claim 1, wherein the first gear on the roller is directly inlaid and fixed onto the roller.

10. The suitcase with charging function according to claim 1, further comprising a battery compartment disposed inside the suitcase body and used to receive the rechargeable battery.

11. The suitcase with charging function according to claim 10, wherein the battery compartment is provided with a shock absorbing layer.

12. The suitcase with charging function according to claim 1, wherein the roller comprises a plurality of fixing holes, and the first gear comprises a plurality of corresponding plug-in pieces for inserting into the fixing holes.

13. The suitcase with charging function according to claim 1, wherein the first gear is located in a groove on an inner side of the first clamping plate and is engaged with the second gear directly.

14. The suitcase with charging function according to claim 1, further comprising a first cover connected to the first clamping plate and used to cover the power generator and the power generator fixing plate.

15. The suitcase with charging function according to claim 1, wherein further comprising a wire anti-intertwining module located on the roller bracket; from bottom to top, the central shaft lever passing through the fixing plate, the wire anti-intertwining module, a seal cover and a top cover in turn; the central shaft lever being fixed to the bottom of the suitcase body by the top cover; the suitcase with charging function further comprising an inner cap disposed on the top cover.

16. The suitcase with charging function according to claim 15, wherein at the bottom of the suitcase body, a space facing internal concave is reserved in a position corresponding to the wire anti-intertwining module and is used to receive the wire anti-intertwining module.

17. The suitcase with charging function according to claim 15, wherein the wire anti-intertwining module comprises:
 a convex piece disposed on the fixing plate, an upper end of the convex piece extending into the suitcase body;
 a plurality of ring-shaped contact parts encircling and fixed onto the convex piece and connected by power lines led out from the generator PCB;
 a seal cover disposed at an upper end of the fixing plate and covering the ring-shaped contact parts; and
 spring pieces fixed on the seal cover, one end of the spring piece passing the seal cover and contacting the ring-shaped contact parts, another end of the spring piece being connected to wires of the PCB.

18. The suitcase with charging function according to claim 15, wherein a bearing is arranged between the fixing plate of the roller bracket and the seal cover of the wire anti-intertwining module.

19. The suitcase with charging function according to claim 1, comprising four groups of the rollers and every group of the rollers is provided with the current generating device and includes two rollers connected through a connecting shaft.

20. The suitcase with charging function according to claim 1, wherein a shock absorbing spring part is arranged between the roller bracket and the bottom of the suitcase body.

* * * * *